US009256621B2

(12) United States Patent
Lessin

(10) Patent No.: US 9,256,621 B2
(45) Date of Patent: Feb. 9, 2016

(54) CLAIMS-BASED QUERYING IN AN ONLINE SYSTEM

(71) Applicant: Facebook, Inc., Menlo Park, CA (US)

(72) Inventor: Samuel Lessin, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 215 days.

(21) Appl. No.: 13/800,679

(22) Filed: Mar. 13, 2013

(65) Prior Publication Data

US 2014/0280322 A1    Sep. 18, 2014

(51) Int. Cl.
  *G06F 17/30*  (2006.01)
  *G06Q 50/00*  (2012.01)

(52) U.S. Cl.
  CPC .... *G06F 17/30283* (2013.01); *G06F 17/30864* (2013.01); *G06F 17/30867* (2013.01); *G06Q 50/01* (2013.01)

(58) Field of Classification Search
  CPC ............... G06F 17/30861; G06F 17/30867
  USPC .......................................................... 707/770
  See application file for complete search history.

(56) References Cited

U.S. PATENT DOCUMENTS

| | | | |
|---|---|---|---|
| 8,239,364 B2 | 8/2012 | Wable et al. | |
| 2007/0198506 A1* | 8/2007 | Attaran Rezaei et al. | 707/5 |
| 2008/0005072 A1* | 1/2008 | Meek et al. | 707/3 |
| 2008/0140650 A1* | 6/2008 | Stackpole | 707/5 |
| 2009/0077062 A1* | 3/2009 | Spivack et al. | 707/5 |
| 2009/0144808 A1* | 6/2009 | Dhananjaya | 726/4 |
| 2009/0164929 A1 | 6/2009 | Chen et al. | |
| 2009/0248682 A1 | 10/2009 | Hueter et al. | |
| 2010/0205537 A1* | 8/2010 | Knighton et al. | 715/751 |
| 2011/0040776 A1 | 2/2011 | Najm et al. | |
| 2011/0119298 A1* | 5/2011 | Arrasvuori et al. | 707/769 |
| 2011/0173175 A1* | 7/2011 | Cone et al. | 707/708 |
| 2011/0178881 A1* | 7/2011 | Pulletikurty | 705/14.73 |
| 2011/0231240 A1* | 9/2011 | Schoen et al. | 705/14.41 |
| 2011/0282891 A1* | 11/2011 | Kraft | 707/765 |
| 2012/0016875 A1* | 1/2012 | Jin et al. | 707/734 |
| 2012/0078870 A1 | 3/2012 | Bazaz | |
| 2012/0158715 A1* | 6/2012 | Maghoul et al. | 707/728 |
| 2012/0203831 A1* | 8/2012 | Schoen et al. | 709/204 |
| 2013/0036109 A1 | 2/2013 | Kulick et al. | |
| 2013/0073632 A1* | 3/2013 | Fedorov et al. | 709/205 |

OTHER PUBLICATIONS

Lessin, S., et al., "Evaluating Claims in a Social Networking System," U.S. Appl. No. 13/455,047, filed Apr. 24, 2012.
PCT International Search Report and Written Opinion, PCT Application No. PCT/US2014/017075, Jul. 4, 2014, thirteen pages.

* cited by examiner

*Primary Examiner* — Christyann Pulliam
*Assistant Examiner* — Sheryl Holland
(74) *Attorney, Agent, or Firm* — Fenwick & West LLP

(57) ABSTRACT

A social networking system allows its users to perform a structured search that returns objects (e.g., other users and pages) in the social networking system. A searching user may remove or add objects to the search by interacting with the returned objects. Adding or removing an object generates a claim stored by the social networking system that an object has or does not have, respectively, characteristics based on the search query. Additionally, the searching user may also request presentation of the search query to other users, which may be selected by the social networking system based on their predicted expertise. A dialog between the searching user and a selected other user may be provided to allow the searching user to provide the search query to the selected other user and to receive a response.

14 Claims, 4 Drawing Sheets

CLAIMS-BASED QUERYING IN AN ONLINE SYSTEM

BACKGROUND

The present invention relates generally to online systems and more particularly to claims-based querying in an online system.

In recent years, online systems, particularly social networking systems, have made it easier for users to share their interests and preferences in real-world concepts, such as their favorite movies, musicians, celebrities, soft drinks, hobbies, sports teams, and activities. These interests may be declared by users in user profiles and may also be inferred by social networking systems. Users may also interact with these real-world concepts through multiple communication channels on social networking systems. For example, users interact with pages on the social networking system, share interesting articles about causes and issues with other users on the social networking system, and comment on actions generated by other users on objects external to the social networking system. Additionally, a social networking system notifies users of actions performed on objects external to the social networking system by other users. Social networking system users also frequently search for various phrases in the social networking system, such as their favorite celebrities, restaurants, karaoke bars, or other content.

A search engine provided by a social networking system may return search results of content posted to the social networking system relevant to the search queries. For example, the search engine provides a user with content item posts, users, entities, pages, groups, events, and applications in the social networking system, that are relevant to received search queries. Simple search engines only return results based on keywords included in the content on the social networking system. However, social networking systems may also record user behavior and interests in addition to posted content, which are not identified by conventional search engines.

Specifically, information available on social networking systems about users' interactions with the social networking system is not accessible to other users as search criteria. Because users may perform thousands of searches on objects within and external to the social networking system on a daily basis, this inaccessibility of user behaviors and interests in online systems limits the information accessible to users searching via the social networking system. These limited search results may reduce user interaction with social networking systems.

SUMMARY

A social networking system allows its users to perform a structured search that returns objects (e.g., other users and pages) in the social networking system. The searching user may remove objects to the search, resulting in a claim made by the searching user to the social networking system that the removed object does not belong to the search query. Similarly, the searching user may add an object to the search query, resulting in a claim made by the searching user to the social networking system that the added object belongs to the search query. Additionally, the searching user may also request a list of other users likely to be knowledgeable about the structured query from the social networking system, which returns a list of other users based on their predicted expertise. A dialog between the searching user and a selected other user may be provided to allow the searching user to provide the search query to the selected other user.

Figure 1:
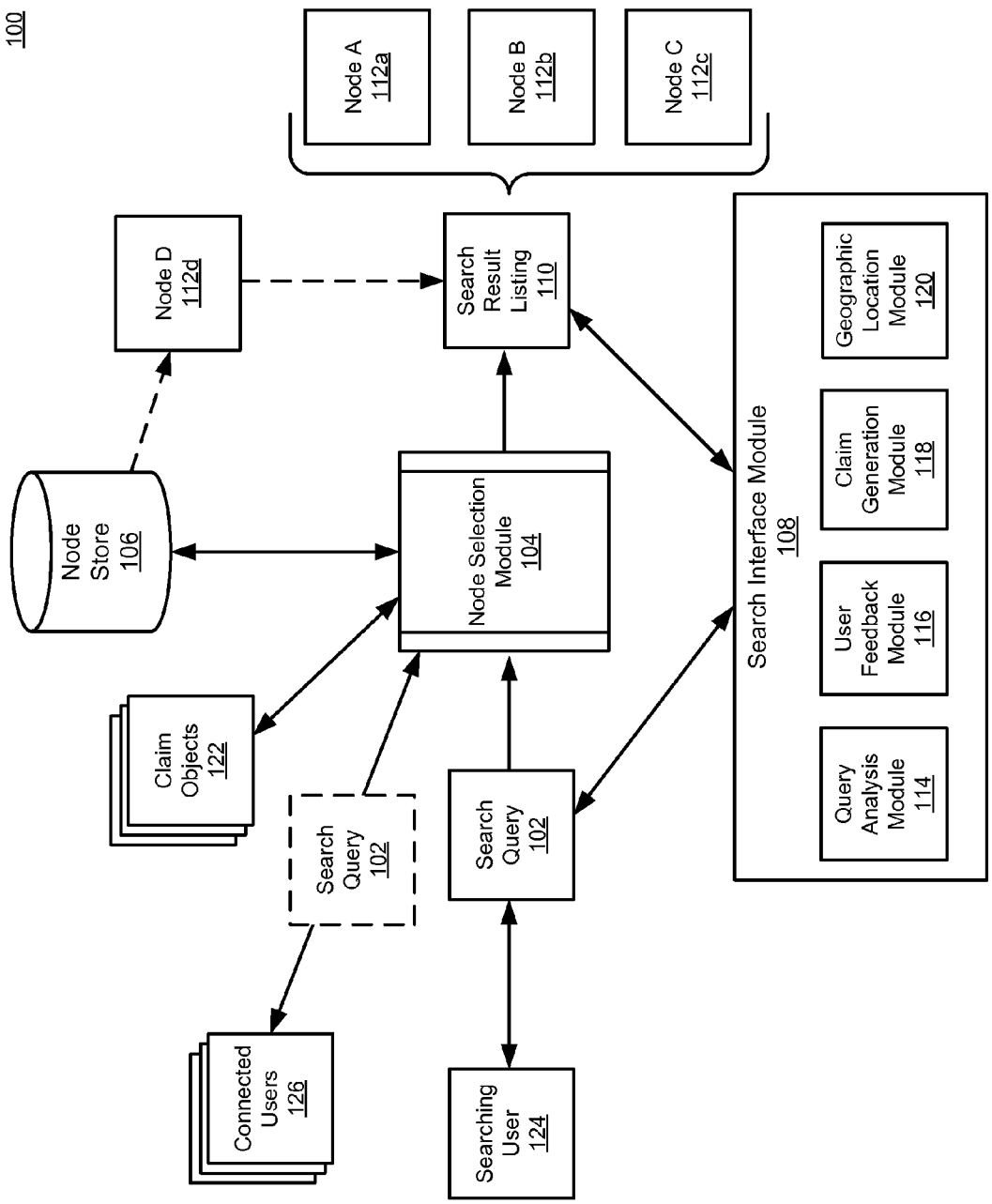
FIG. 1 is a high-level block diagram of a process for claims-based querying in a social networking system according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System

A social networking system offers its users the ability to communicate and interact with other users of the social networking system. Users join the social networking system and add connections to a number of other users to whom they desire to be connected. Additionally, users of social networking system provide information describing themselves that is stored by the social networking system as user profiles. For example, users may provide their age, gender, geographical location, education history, employment history, or other suitable information to the social networking system. The information provided by users may be used by the social networking system to direct information to the user. For example, the social networking system may recommend social groups, events, and potential friends to a user. The social networking system may also enable users to explicitly express interest in one or more concepts, such as celebrities, hobbies, sports teams, books, and music. These interests may be used in a myriad of ways, including targeting advertisements and selecting relevant stories for a user about other users of the social networking system based on shared interests.

The social networking may store data about its users and other objects using a social graph that includes nodes connected by edges. Nodes include users and objects of the social networking system, such as web pages embodying concepts and entities. Edges connect nodes and represent a particular interaction between the objects or users corresponding to the two nodes. For example, an edge indicates when a user expresses an interest in a news article shared by another user about "America's Cup." Hence, the social graph records interactions between users of the social networking system as well as interactions between users and objects of the social networking system by storing information in the nodes and edges that represent these interactions.

Additionally, the social graph may include custom graph object types and graph action types defined by third-party developers as well as social networking system administrators of the social networking system. This allows third-party developers or administrators to define attributes of graph objects and graph actions. For example, a graph object for a movie may have several defined object properties, such as a title, actors, directors, producers, year, and the like. A graph action type, such as "purchase," may be used by a third-party developer on a website external to the social networking system to report actions performed by users of the social networking system on the external website. This allows the social graph to be "open," by allowing third-party developers to create and use the custom graph objects and actions on external websites.

Third-party developers may enable social networking system users to express interest in web pages or other content provided by websites external to the social networking system. For example, web pages may be represented as page objects in the social networking system by embedding a widget, a social plug-in, programmable logic or, a code snippet (e.g., an iframe) into the web pages. Hence, any concept that can be embodied in a web page may become a node in the social graph on the social networking system. This allows social networking system users to interact with objects external to the social networking system relevant to a keyword or keyword phrase, such as "Justin Bieber." Each interaction with an object may be recorded by the social networking system as an edge, which may allow advertisers to target advertisements based on user interactions with objects related to a keyword. This allows the advertisements to reach a more receptive audience including users previously performing an action related to the advertisement. For example, a merchandiser that sells Justin Bieber t-shirts, hats, and accessories may target ads for new merchandise to users that have recently performed one or more specific actions, such as listening to Justin Bieber's song "Baby," purchasing Justin Bieber's new fragrance, "Someday," commenting on a fan page for Justin Bieber, and attending an event on a social networking system for the launch of a new Justin Bieber concert tour. Enabling third-party developers to define custom object types and custom action types is described further in U.S. application Ser. No. 13/239,340 filed on Sep. 21, 2011, which is hereby incorporated by reference in its entirety.

The social networking system may additionally or alternatively maintain a collection of claims made by users and entities of the social networking system. A claim, as stored as a data structure in the social networking system, includes multiple components. For example, a claim includes one or more of: an author, an owner, an assertion, an audience, copyrights, and metadata associated with the claim by the social networking system. A user may make a number of "claims" on a social networking system, such as having attended a certain college, working for a certain company, being raised in a certain location, or being friends with other users of the social networking system. Claims on a social networking system include other declared user profile information, such as where the user currently lives and other biographical information about the user, including the age, gender, hometown, dating interests, relationship status, languages spoken, religious beliefs, and political views, as well as other information, including contact information, work and education experience, family members, historical events posted to a timeline, and favorite quotes.

Claims may be "authored" by "agents" of the social networking system. Examples of an agent include such as users, entities, and applications authorized to act on behalf of an agent. An author agent may designate an "owner" to assign ownership of a claim. An owner agent may specify certain settings for a claim, such as whether the claim may be copied by other agents and whether the claim may be boosted in rankings by other agents. Each claim includes an "assertion" having a "payload" of content that is stored by the social graph. The payload of content is the core of an assertion. A claim may have a claim type; for example, a claim that a user currently lives in San Francisco has a claim type of "current city." The claim type may be specified by a metadata object provided by the social networking system. The structure of claims is further discussed in U.S. patent application Ser. No. 13/455,047, filed on Apr. 24, 2012, hereby incorporated by reference in its entirety.

A social networking system may allow its users to generate structured queries for content that return objects (e.g., users, entities, and/or agents) of the social networking system. For example, a searching user may generate a query for "people nearby that are hungry and like Lady Gaga." Rather than searching for content items that include the keywords "people," "hungry," and "Lady Gaga," the social networking system may interpret the query as the searching user searching for other users (people) that are hungry (users that have recent status messages indicating hunger or lack of recent meal) and that have performed actions on the social networking system indicating an interest in Lady Gaga (song listen actions, posts about Lady Gaga, explicit declaration of interest in Lady Gaga, connected to a page for Lady Gaga, etc.). Hence, the social networking system may use machine learning and regression analysis to select objects for inclusion in the search results based on the searching user's query.

FIG. 1 illustrates a high-level block diagram of one embodiment of a process for claims-based querying in a social networking system. In the example shown by FIG. 1, the social networking system 100 receives a search query 102 from a searching user 124 through a user interface provided by the search interface module 108. In another embodiment, the social networking system 100 may receive one or more search queries 102 through an application programming interface (API) provided by the search interface module 108. A query analysis module 114 included in the search interface module 108 analyzes the search query 102 to determine relevant nodes 112 for inclusion in a search result listing 110. A node selection module 104 may receive the search query 102 and return a relevant search result listing 110 comprising one or more nodes. As illustrated in FIG. 1, the search result listing 110 comprises node A 112a, node B 112b, and node C 112c. Search results may include structured results, allowing the social networking system to provide search results including objects of the social networking system 100.

FIG. 1 and the other figures use like reference numerals to identify like elements. A letter after a reference numeral, such as "112a," indicates that the text refers specifically to the element having that particular reference numeral. A reference numeral in the text without a following letter, such as "112," refers to any or all of the elements in the figures bearing that reference numeral (e.g. "112" in the text refers to reference numerals "112a," "112b," "112c" and/or "112d" in the figures). For purposes of illustration, FIG. 1 shows four nodes 112, although any number may be included.

After a searching user 124 provides a search query 102 to the social networking system 100 through the search interface module 108, a search result listing 110 is provided to the searching user 124 through an interface provided by the search interface module 108. Additionally, a feedback module 116 in the search interface module 108 may provide the user with options to confirm or reject the nodes 112 included in the search result listing 110. For example, if the searching user 124 confirms that a user connected to the searching user 124 (a "connected user"), Michael, is a person that likes Lady Gaga, the searching user 124 generates a claim in the social networking system 100 that Michael likes Lady Gaga. Claims may also be generated if the searching user 124 rejects nodes included in the search result listing 110. Continuing the example, if the searching user 124 provides feedback rejecting users Bob and Robin from the search result listing 110 for a search query 102 that asks for "people who like Lady Gaga," the searching user 124 generates claims that Bob and Robin do not like Lady Gaga. In one embodiment, a claim generation module 118 included in the search interface module 108 generates claims from user feedback on search results listings 110. Claims generated by the claim generation module 118 are stored as claim objects 122 in the social networking system 100.

Additional nodes may be included in a search result listing 110 if the searching user 124 requests to add particular nodes. For example, if the searching user 124 decides that Edgar should be included in the search result listing 110 responsive to the search query 102 of "people who like Lady Gaga," then a node D 112d representing Edgar in the social networking system 100 may be added to the search result listing 110. Therefore, the searching user 124 may customize the search result listing 110 by adding or removing users or objects from the search result listing 110. By adding a node corresponding to a user or an object to the search result listing 110, the searching user 124 generates a claim that the particular node conforms with the search query 102. In the example above, the claim authored by the searching user 124 is that Edgar likes Lady Gaga. A claim object 122 representing the generated claim is stored in the social networking system 100 and may be accessed by other users depending on the audience of the claim set by the searching user 124. In one embodiment, search result listings 110 are stored in the social networking system 100 for later retrieval.

A search results listing 110 for a search query 102 may include other objects maintained by the social networking system 100. For example, a search results listing 110 includes content posts by social networking system users, pages, groups, and other entities connected to viewing users in the social networking system 100, pages, groups, users, events, applications, topics, interests, entities, claims, and any other suitable objects maintained by the social networking system 100. For example, a user provides a search query 102 for "people nearby that are hungry." In this example, the query analysis module 114 interprets "nearby" as a location query and limits search results to users within a threshold geographic distance to the location associated with the searching user 124. A geographic location module 120 may retrieve the current geographic location of connected users 126 to the searching user 124 based on status updates, check in events, and/or other content items or communications with the social networking system 100 providing a geographic location to the social networking system 100. Other search queries may include specific geographic locations, such as "best restaurants in Palo Alto," or "fun things to do in Paris." Search results based on search queries 102 including a specific location include objects associated with the specific location, such as check-in events associated with the location specified by the search query 102, third-party website reviews associated with the specified location and stored by the social networking system 100, user-generated lists of activities associated with the specified location, or any other suitable object associated with the specified location.

The query analysis module 114 may determine that certain terms in a search query 102, such as the term "hungry," indicate a question about users' mental status of users. Mental status may be declared by users or inferred by the social networking system 100 based on objects associated with the users. For example, the node selection module 140 retrieves a claim object 122 including a claim that Brian and Carlo are currently hungry based on status updates generated by one or both users including terms such as "hungry," "looking to eat," and "empty stomach." In one embodiment, the social networking system 100 may generate claims about users of the social networking system 100 predicting the users' mental status based on actions performed by the users. For example, the social networking system 100 generates a claim predicting whether users are currently hungry based on previous check-in events at dining establishments earlier in the day.

The search interface module 108 provides an interface for searching users to provide search queries to the social networking system 100. In one embodiment, the search interface module 108 allows users of the social networking system 100 to generate search queries for processing by the social networking system 100 from websites external to the social networking system 100. The search interface module 108 may communicate with a social plugin or iframe included in content from an external website, a desktop application, a native mobile application, a web browser application, or any other suitable interface to allow users to generate search queries on websites outside of the social networking system 100 as well as on the social networking system 100.

A query analysis module 114 receives search queries received from searching users and identifies structured elements in the social networking system 100, such as applications, interests, topics, entities, users, groups, events, content items, or other objects. A structured element may be an object in the social networking system 100 corresponding to a node in a social graph maintained by the social networking system 100. Examples of objects corresponding to nodes maintained by the social networking system 100 include applications, interests, topics, entities, users, groups, events, and content items. This allows the social networking system 100 to determine whether the searching user is searching for a person, an entity, a group, an application, a concept, an event, a content item, or any other object.

The node selection module 104 retrieves nodes 112 from a node store 106 based on analysis of a search query by the search interface module 108, in one embodiment. Alternatively, the search interface module 108 enables a searching user 124 to request one or more connected users 126 associated with the search query 102 provided to the search interface module 108. Continuing a previous example, after receiving a search results listing 110 of nodes 112, the searching user 124 may request that the search query 102 "people who like Lady Gaga" be communicated to connected users 126. The node selection module 104 identifies one or more connected users 126 having a threshold likelihood of knowing the answer to the search query 102 based on the interests and behaviors of the one or more connected users 126. As connected users 126 respond to the request with answers to the search query 102, the search interface module 108 generates one or more claims. For example, if the searching user 124 requests that one or more connected users 126 respond to the search query 102 "people who like Lady Gaga" and multiple connected users 126 identify Michael, Michelle, and Antonia, the searching user 124 are making a claim that Michael, Michelle, and Antonia like Lady Gaga.

In one embodiment, claims generated by the search interface module 108 have an audience (or privacy setting) of only the searching user 124. In another embodiment, the audience of claims generated by the search interface module 108 may include other users, such as connected users 126 asked to respond to the search query 102. The audience of the claims may be set by the searching user 124 to only the searching user 124, other users connected to the searching user 124, other users of the social networking system 100, all users of the social networking system 100, or to any other set of social networking system users.

System Architecture

Figure 2:
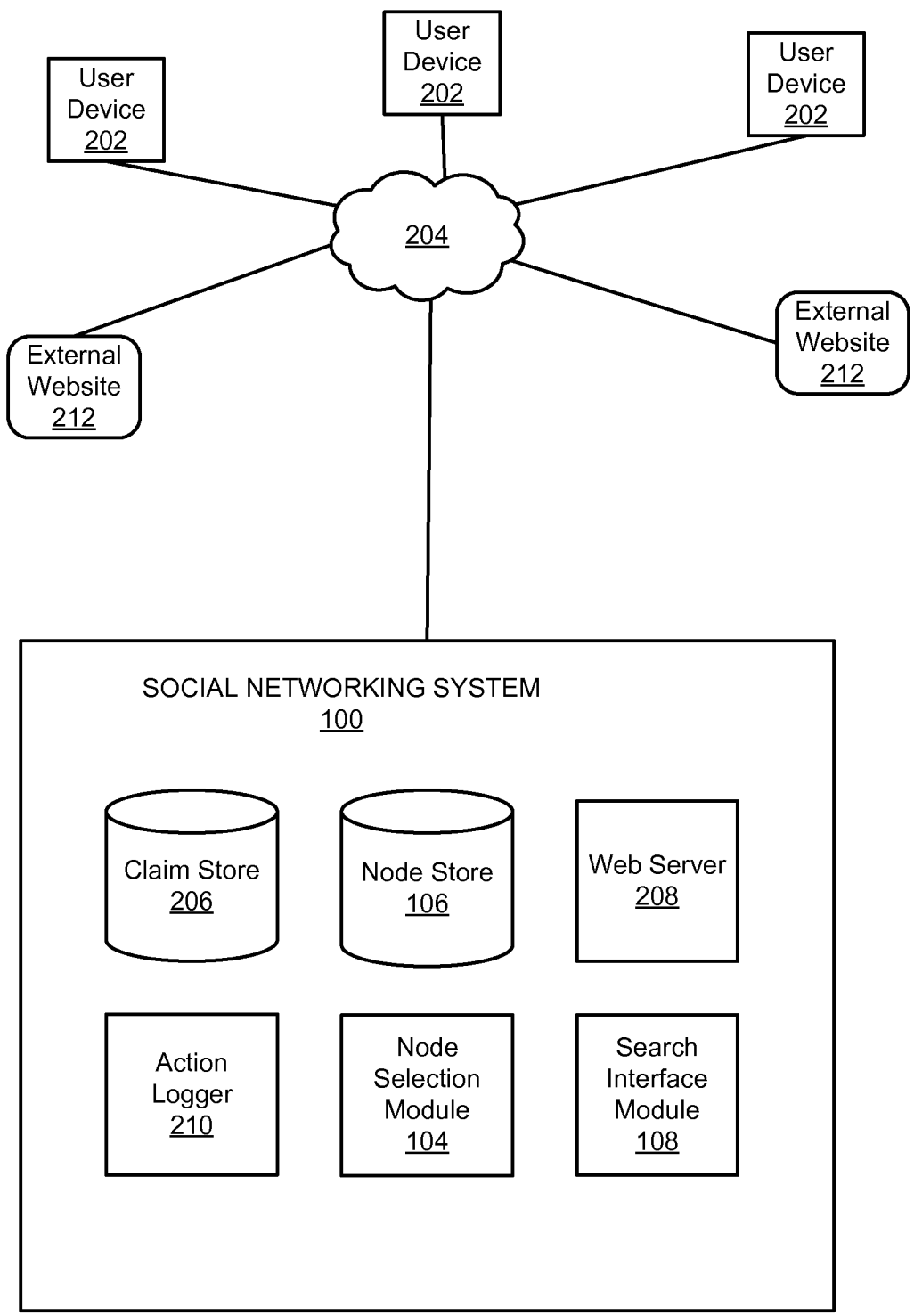
FIG. 2 is a high-level block diagram of a system for claims-based querying in a social networking system, according to one embodiment.

FIG. 2 is a high level block diagram of one embodiment of a system environment suitable for claims-based querying in an online system, such as the social networking system 100. The system environment shown by FIG. 2 comprises one or more user devices 202, the social networking system 100, a network 204, and external websites 212. In alternative configurations, different and/or additional modules can be included in the system.

The user devices 202 comprise one or more computing devices for receiving user input as well as transmitting and/or data via the network 204. In one embodiment, the user device 202 is a conventional computer system executing, such as a desktop or laptop computer. Alternatively, the user device 202 may be a device having computer functionality, such as a personal digital assistant (PDA), mobile telephone, smartphone, or another suitable device.

A user device 202 is configured to communicate via network 204. For example, the user device 202 executes an application, such as a browser application, allowing a user of the user device 202 to interact with the social networking system 100. Alternatively, the user device 202 interacts with the social networking system 100 through an application programming interface (API) running on a native operating system of the user device 202, such as IOS® or ANDROID™.

In one embodiment, the network 204 uses standard communications technologies and/or protocols. Thus, the network 204 may include communication channels using technologies such as Ethernet, 802.11, worldwide interoperability for microwave access (WiMAX), 3G, 4G, code division multiple access (CDMA), digital subscriber line (DSL), or any other suitable technology. Similarly, the networking protocols used on the network 204 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). The data exchanged over the network 204 may be represented using technologies and/or formats including the hypertext markup language (HTML) and the extensible markup language (XML). In addition, all or some of the communication channels may be encrypted using conventional encryption technologies such as secure sockets layer (SSL), transport layer security (TLS), and Internet Protocol security (IPsec).

FIG. 2 includes a block diagram of an embodiment of the social networking system 100. In the example shown by FIG. 2, the social networking system 100 includes a node selection module 104, a node store 106, a search interface module 108, a claim store 206, a web server 208, and an action logger 210. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 to one or more user devices 202 via the network 204; the web server 208 serves web pages, as well as other content, such as JAVA®, FLASH®, XML, and so forth. The web server 208 may receive and route messages between the social networking system 100 and the user devices 202. In various embodiments, the messages may be instant messages, queued messages (e.g., email), text and short message service (SMS) messages, or messages sent using any other suitable messaging technique. The user may send a request to the web server 208 to upload information, for example, images or videos that are stored in the claim store 206. Additionally, the web server 208 may provide application programming interface (API) functionality to send data directly to native user device operating systems, such as IOS®, ANDROID™, or RIM®. For example, a user may create a check-in event at a coffee shop in San Francisco, Calif. that is shared with other users connected to the user.

The action logger 210 receives communications from the web server 208 about user actions internal to or external to the social networking system 100. Based on the received communications the action logger 210 populates an action log with information about user actions. Examples of user actions include adding a connection to another user, sending a message to another user, uploading an image, reading a message from another user, viewing content associated with another user, attending an event created by another user, among others. In addition, a number of actions described in connection with other objects are directed at particular users, so these actions are also associated with those users.

An action log may be used by a social networking system 100 to log users' actions on the social networking system 100 as well as on external websites 212 that communicate information back to the social networking system 100. Information communicated to the social networking system 100 from an external website 212 is limited by users' privacy settings; additionally, user identifying information provided to external websites 212 for identifying users may be hashed or otherwise anonymized. Hence, the action log may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log records data about these users, including viewing histories, advertisements that were accessed, purchasing activity, and other patterns from shopping and buying.

User account information and other related information for a user are stored as user profiles in the node store 106. The user profile information stored in node store 106 describes users of the social networking system 100, including biographic, demographic, and other types of descriptive information, such as work experience, educational history, gender, hobbies or preferences, location, and the like. A user profile may also include other information provided by the user, for example, images or videos. In certain embodiments, images of users may be tagged with information identifying users of the social networking system 100 displayed in an image. The node store 106 also maintains references to the actions stored in an action log and performed by users on objects in the claim store 206.

The claim store 206 also stores edge information describing connections between users and other objects on the social networking system 100. Some edges may be defined by users, allowing users to specify their relationships with other users. For example, users may generate edges with other users that parallel the users' real-life relationships, such as friends, coworkers, partners, and so forth. Other edges are generated when users interact with objects in the social networking system 100. For example, edges are generated when users express interest in a page on the social networking system 100, share a link with other users of the social networking system 100, or comment on posts made by other users of the social networking system 100.

The claim store 206 stores information about edges, such as affinity scores for objects, interests, and other users. Affinity scores may be computed by the social networking system 100 over time to approximate a user's interest for an object, interest, and other users in the social networking system 100 based on the actions performed by the user. Multiple interactions between a user and a specific object may be stored as a single edge in the claim store 206, in one embodiment. For example, a user that plays multiple songs from Lady Gaga's album, "Born This Way," may have multiple edges for the songs, but a single edge for Lady Gaga.

Claims-Based Querying in an Online System

Figure 3:
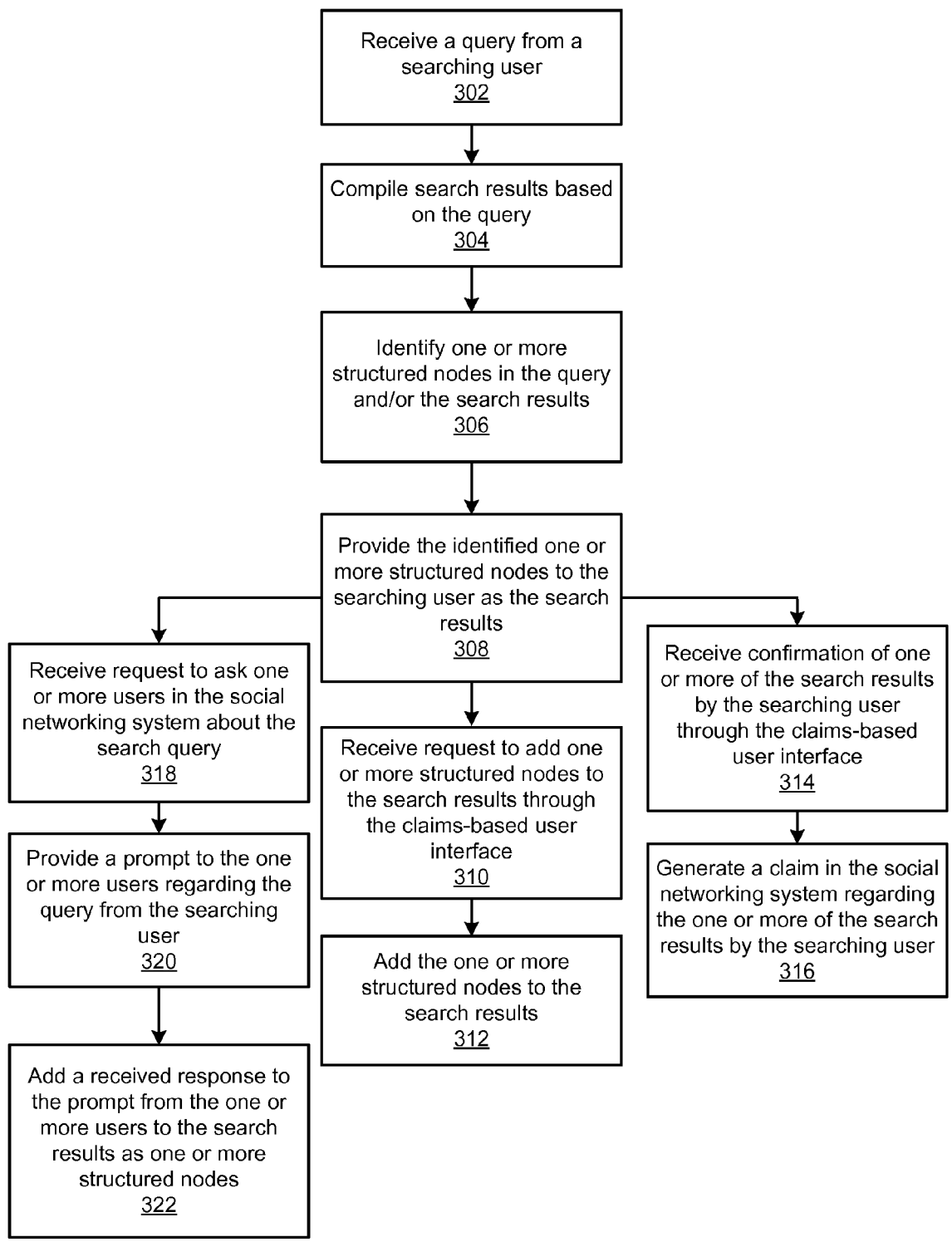
FIG. 3 is a flow chart describing a process of claims-based querying a social networking system, according to one embodiment.

FIG. 3 illustrates a flow chart of one embodiment of a process for claims-based querying in a social networking system 100. The social networking system 100 receives 302 a query from a searching user. For example, the query is received 302 from a user interface on a user device connected to the social networking system 100. As another example, the query is received 302 from an interface of a system external to the social networking system 100, such as an external website 212. However, the query may be received 302 from any suitable type of interface, such as an application programming interface (API).

Search results are complied 304 based on the query. The search results may be compiled 304 using a real time search engine on the social networking system 100 that searches for terms included in the query among the content items, entities, users, events, groups, applications, and other objects maintained by the social networking system 100. In one embodiment, the search results based may be compiled 304 using other search terms relevant to the received search query. Alternatively, the social networking system 100 interprets the search query to compile 304. For example, the social networking system 100 interprets the search results, such as a query for "good restaurants near San Francisco" as requesting recommended restaurants for dining with a threshold distance of San Francisco, rather than requesting content items posted by users including the words "restaurants near San Francisco." Therefore, the social networking system 100 identifies objects corresponding to "restaurants" and that have location properties near San Francisco, Calif., USA.

One or more structured nodes in the query and/or the search results are identified 306 from the compiled search results. Structured nodes in the social networking system 100 include users, entities, applications, events, groups, content items, and other objects. The social networking system 100 may identify 306 structured nodes in the query and/or the search results based on one or more properties of objects in the search results and/or terms in the search query. Alternatively, the social networking system 100 identifies 306 structured nodes in the query by retrieving one or more objects relevant to search terms in the query and determining one or more structured nodes in the social networking system 100 based on the retrieved one or more objects. In another embodiment, the social networking system 100 interprets the query and identifies nodes based on the interpretation of the query. For example, location keywords such as "nearby" and "near" may be interpreted by the social networking system 100 to filter the search results to nodes having a location within a threshold distance of the location of the searching user.

The identified one or more structured nodes are provided 308 in an interface as the search results. In one embodiment, the searching user interacts with the one or more identified structured nodes through the user interface. Examples of interactions with the one or more structured nodes include providing user feedback regarding the correctness of one or more of the search results relative to the search query, adding a node to the search results, removing a node from the search results, and asking other users to respond to the search query.

For example, an indication of adding one or more structured nodes to the search results through the interface is received 310. The searching user may request to add one or more structured nodes by typing the name of the one or more nodes in the interface. The one or more identified structured nodes are added 312 to the search results. In one embodiment, the search results are stored in the social networking system 100 in association with the searching user as a customized response to the search query. In another embodiment, a claim is generated by the social networking system 100 indicating the searching user has claimed the search results are relevant to the search query.

An indication of user feedback regarding one or more of the search results may be received 314 from the searching user via the interface. User feedback for a search result may indicate that the searching user confirms or rejects the relevance of the search result to the search query. A claim is generated 316 in the social networking system 100 by the searching user regarding the one or more of the search results based on the user feedback.

After providing the identified one or more structured nodes to the searching user, the social networking system may receive 318 a request to ask one or more users connected to the searching user in the social networking system 100 about the query. Users to receive the query may be selected by the social networking system 100 based on information about the users stored by the social networking system 100. For example, users are selected based on user profile information, interests, user actions stored by the social networking system 100, content posted by the users, applications on the social networking system 100, connections between users and other objects maintained by the social networking system 100. Other examples of information that may be used to select users include explicitly stated user interests, implicit or inferred user interests or connections based on a user's past history, demographic, social activity, activity of users connected to the users activity, subscriptions, or other suitable information.

A prompt may be provided 320 to one or more of the identified connected users regarding the query from the searching user. The prompt may be provided 320 in a dialog box on the social networking system 100 or through any suitable communication channel (e.g., text message, email, chat, content item, poll, pop-up box, phone call, video conferencing call, etc.). A received response to the prompt from the one or more users regarding the search query from the searching user may then be added 322 to the search results as one or more structured nodes. The received response to the prompt may also be stored as a claim in the social networking system 100. Alternatively, the received response to the prompt may be stored as a content item in the social networking system 100 and included in the social graph.

Figure 4:
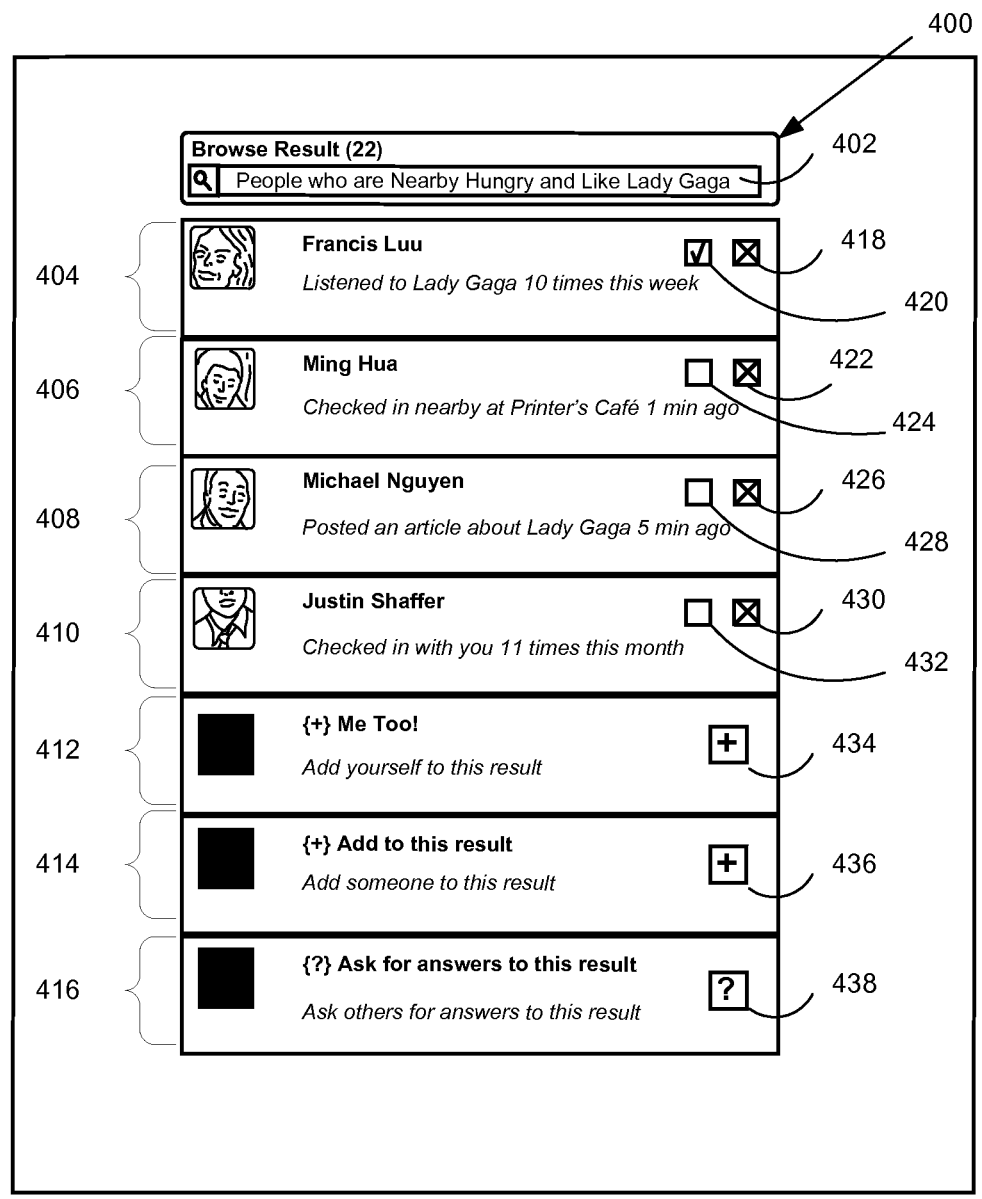
FIG. 4 depicts an example screenshot of a process of claims-based browsing objects in a social networking system, in accordance with an embodiment of the invention.

FIG. 4 illustrates an example screenshot of one embodiment of a process for claims-based browsing objects in a social networking system. In the example of FIG. 4, a social networking system 100 is browsed by a viewing user on a user device 202 after a search query has been performed. In the claims-based query user interface 400 shown by In FIG. 4, a search bar 402 is provided to the viewing user. As shown, the viewing user has searched for "People who are Nearby Hungry and like Lady Gaga," and the claims-based query user interface 400 displays search results 404, 406, 408, and 410.

Each of the search results 404, 406, 408, and 410 are users of the social networking system 100 because of the term "people" included in the search query. In other embodiments, the search results 404, 406, 408, and 410 may also include pages, events, or other objects. The claims-based user interface 400 also includes a prompt 412 for the searching user to add itself to the search results listing. Additionally, the claims-based user interface 400 includes a prompt 414 for the searching user to add one or more additional users to the search results listing. By either adding themselves or adding users to the search result listing, the viewing user generates claims in the social networking system 100 that the added users comply with the search query. Interface elements 434 and 436 may also be used to, respectively, add the viewing user and one or more additional users to the search results listing.

Further, the claims-based user interface 400 includes a prompt 416 for the viewing user to ask other users the provided search query. This notifies the users selected by the viewing user of the search query. After one or more of the selected other users provide with social networking system 100 a response to the search query, the search results listing is updated by the social networking system 100. In addition, the viewing user may receive a notification through the social networking system 100 that one or more of the selected other users have responded to the prompt. Interface element 438 may also be used to ask one or more other users to respond to the search query.

The claims-based user interface 400 also includes several buttons for each of the search results 404, 406, 408, and 410. Interface elements 418, 422, 426, and 430 are provided for receiving user feedback to remove a corresponding entry from the search results 404, 406, 408, and 410. Removing an entry from the search results 404, 406, 408, and 410 generates a new claim that an object (e.g., a user) corresponding to the removed entry does not comply with the search query according to the viewing user.

Other interface elements 420, 424, 428, and 432 may be provided in conjunction with the search results 404, 406, 408, and 410 to indicate whether the viewing user agrees with the inclusion of an entry of the search results 404, 406, 408, and 410, which generates a claim to the social networking system 100 that an object corresponding to an entry in the search results 404, 406, 408, and 410 complies with the search query. In this example, interface 420 is checked, meaning that the viewing user agrees that Francis Luu is a person who is nearby, hungry, and likes Lady Gaga, making a corresponding claim regarding Francis Luu in the social networking system 100. The other interface elements 424, 428, and 432 remain unaccessed, so the searching user has not made a claim with respect to the compliance of the listed users with the search query.

The listed search results 404, 406, 408, and 410 displayed by the claims-based querying user interface 400 shown by in FIG. 4 may be predicted by the social networking system 100 to be relevant to the search query presented based on the structured query and other factors. Factors for determining relevance of objects to a searching user for search results are further discussed in U.S. Pat. No. 8,239,364, filed on Jun. 15, 2010, which is hereby incorporated by reference in its entirety. Other factors may include interpreting keywords such as "hungry" and "nearby" based on heuristics analysis and real-time location coordinates.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by a social networking system, a search query from a searching user, the search query including one or more terms;
   identifying one or more objects maintained by the social networking system and associating with data matching one or more of the terms included in the search query;
   presenting, via a graphical user interface, the identified one or more objects to the searching user in a list and included as part of the list is a prompt to request that the search query be presented to one or more additional users of the social networking system and a second prompt requesting the searching user provide feedback for the identified one or more objects;

receiving a request from the searching user, based in part on a selection of an interface element included in the prompt, to present the search query to the one or more additional users of the social networking system;

selecting one or more users, of the additional users, to be presented with the search query based in part on each user of the one or more users have a threshold likelihood of knowing an answer to the search query based on information associated with that user by the social networking system;

presenting the search query to the selected one or more users;

receiving a response to the search query from a first user of the selected one or more users;

generating a claim responsive to the received response, the claim indicating an assertion of the first user relative to the search query;

modifying the identified one or more objects to include an object based in part on the received response;

presenting the object as one of the identified one or more objects; and storing the generated claim and an association between the selected first user and the search query.

2. The method of claim 1, wherein selecting one or more users, of the additional users, to be presented with the search query based in part on each user of the one or more users have a threshold likelihood of knowing an answer to the search query based on information associated with that user by the social networking system comprises:

identifying one or more users connected to the searching user via the social networking system;

retrieving user profiles associated with identified one or more users connected to the searching user; and selecting one or more of the identified users based on the associated user profiles and the search query.

3. The method of claim 1, wherein based in part on each user of the one or more users have a threshold likelihood of knowing an answer to the search query based on information associated with that user by the social networking system comprises:

retrieving user profiles and stored actions associated with one or more users of the social networking system; and selecting one or more of the identified users based on the associated user profiles, stored actions, and the search query.

4. The method of claim 3, wherein the associated user profiles include explicitly stated user interests, implicit user interests, inferred user interests, and demographic information.

5. The method of claim 1, wherein presenting the search query to the selected one or more users comprises presenting the search query using one or more selected from a group consisting of: text message, electronic mail, chat message, content item presented by the social networking system, and any combination thereof.

6. A method comprising:

receiving, by a social networking system, a search query from a searching user, the search query including one or more terms;

identifying one or more objects maintained by the social networking system and associating with data matching one or more of the terms included in the search query;

presenting, via a graphical user interface, the identified one or more objects to the searching user in a list and included as part of the list is a prompt requesting the searching user identify an additional object to add to the one or more objects and a second prompt to request that the search query be presented to one or more additional users of the social networking system;

receiving a request from the searching user, based in part on a selection of an interface element included in the prompt, identifying a first additional object to add to the one or more objects;

generating a claim responsive to the received request, the claim indicating an assertion of the searching user to add a first additional object to the identified one or more objects;

modifying the identified one or more objects to include the first additional object based in part on the received request;

presenting the first additional object as one of the identified one or more objects; and storing data that includes the claim, the data indicating that the first additional object has one or more characteristics associated with the search query and identifying the searching user.

7. The method of claim 6, further comprising:

storing an association between the searching user and the identified one or more objects and the searching user.

8. The method of claim 6, wherein presenting, via the graphical user interface, the identified one or more objects to the searching user comprises: presenting the identified one or more objects to the searching user using one or more selected from a group consisting of: text message, electronic mail, chat message, content item presented by the social networking system, and any combination thereof.

9. A method comprising:

receiving, by a social networking system, a search query from a searching user, the search query including one or more terms;

identifying one or more objects maintained by the social networking system and associating with data matching one or more of the terms included in the search query;

presenting, via a graphical user interface, the identified one or more objects to the searching user in a list and included as part of the list is a prompt requesting the searching user provide feedback for the identified one or more objects and a second prompt to request that the search query be presented to one or more additional users of the social networking system;

receiving feedback from the searching user, based in part on a selection of an interface element included in the prompt, for the identified one or more objects;

generating a claim responsive to the selection, the claim indicating an assertion of the searching user to modify the one or more identified objects;

modifying the one or more identified objects based on the received feedback; and presenting the modified one or more objects to the searching user.

10. The method of claim 9, wherein receiving feedback from the searching user, based in part on the selection of the interface element included in the prompt, for the identified one or more objects comprises:

receiving a request from the searching user to include an additional object in the identified one or more objects.

11. The method of claim 10, wherein modifying the one or more identified objects based on the received feedback comprises:

including the additional object in the identified one or more objects; and storing an indication the additional object has one or more characteristics associated with the search query and an association between the searching user and the additional object.

12. The method of claim 9, wherein receiving feedback from the searching user, based in part on the selection of the interface element included in the prompt, for the identified one or more objects comprises:

receiving a request from the searching user to remove an object from the identified one or more objects.

13. The method of claim 12, wherein modifying the one or more identified objects based on the received feedback comprises:

removing the object from the identified one or more objects; and storing an indication the object does not have one or more characteristics associated with the search query and an association between the searching user and the additional object.

14. The method of claim 9, wherein presenting, via the graphical user interface, the identified one or more objects to the searching user comprises: presenting the identified one or more objects to the searching user using one or more selected from a group consisting of: text message, electronic mail, chat message, content item presented by the social networking system, and any combination thereof.

* * * * *